United States Patent
Mano

(10) Patent No.: US 8,366,240 B2
(45) Date of Patent: Feb. 5, 2013

(54) LIQUID DISCHARGING APPARATUS

(75) Inventor: Takahiro Mano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 12/760,295

(22) Filed: Apr. 14, 2010

(65) Prior Publication Data

US 2010/0265291 A1 Oct. 21, 2010

(30) Foreign Application Priority Data

Apr. 15, 2009 (JP) ................................. 2009-099182

(51) Int. Cl.
*B41J 2/15* (2006.01)

(52) U.S. Cl. ................. 347/41; 347/5; 347/9; 358/3.24; 358/1.16; 358/1.17

(58) Field of Classification Search ........................ None
See application file for complete search history.

(56) References Cited

U.S. PATENT DOCUMENTS

| | | | |
|---|---|---|---|
| 6,406,111 B1 * | 6/2002 | Klassen et al. | 347/9 |
| 7,408,676 B2 | 8/2008 | Yazawa et al. | |
| 2007/0103495 A1 * | 5/2007 | Niekawa et al. | 347/9 |

FOREIGN PATENT DOCUMENTS

| | | |
|---|---|---|
| JP | 2000-127372 A | 5/2000 |
| JP | 2002-103687 A | 4/2002 |
| JP | 2004-042432 A | 2/2004 |
| JP | 2005-059363 A | 3/2005 |
| JP | 2008-093982 A | 4/2008 |
| JP | 2008093982 A * | 4/2008 |

OTHER PUBLICATIONS

Derwent document for JP 2008-093982 A. (JP 2008-093982 A was published on Apr. 24, 2008).*

* cited by examiner

*Primary Examiner* — Matthew Luu
*Assistant Examiner* — Justin Seo
(74) *Attorney, Agent, or Firm* — Kilpatrick Townsend & Stockton LLP

(57) ABSTRACT

A printer including a printing section with a printing head is disclosed. The printer head includes a plurality of nozzles configured to discharge liquid on a medium at a pass resolution. The printing section being configured to determine the maximum pass number N required to repeatedly move the printing head to print on a section of the medium at a desired resolution. The desired resolution is greater than the pass resolution. The printing section is further configured to determine which passes of N will be designated to discharge the liquid from each nozzle of the plurality of nozzles, and whether or not an idle pass is required for each nozzle of the plurality of nozzles. When an idle pass is required for each nozzle of the plurality of nozzles, the printing section is configured to modify the maximum divided pass number N to divided pass number M, M being less than N.

20 Claims, 10 Drawing Sheets

LIQUID DISCHARGING APPARATUS

This application claims priority to Japanese Patent Application No. 2009-099182, filed Apr. 15, 2009, the entirety of which is hereby incorporated by reference.

BACKGROUND

The present invention generally relates to a liquid discharging apparatus including a movable liquid discharging head, and more specifically to an ink jet printer including a movable printing head.

An example of liquid discharging apparatus is an ink jet printer (hereinafter, simply referred to as a "printer") including a movable printing head. An example of a printing method used by a printer is printing one line of dots by repeating a carriage movement a plurality of times to achieve a printing result with a high resolution, which is known (see JP-A-2002-103687). According to this printing method, the printer is configured to print one line along the scanning direction of the carriage by repeating a printing process a number of times (e.g., 4 times) at a predetermined resolution (e.g., 360 dpi), while changing the printing position each time. As a result, the printer is able to print the one line with a resolution calculated by multiplying the predetermined resolution by the number of times the printing process is repeated (e.g., 360× 4=1440 dpi).

This printing method can achieve a printing result with a high resolution; however, this printing method is problematic because it takes too much time to print, because the carriage movement needs to be repeated a plurality of times in order to print each line.

SUMMARY

One advantage of the invention is to provide a shortened time period that is required to complete a liquid discharging process using a liquid discharging apparatus. The liquid discharging apparatus being configured to discharge liquid for each line on a predetermined medium by repeating a carriage movement a plurality of times.

A liquid discharging apparatus according to an aspect of the invention is a liquid discharging apparatus that repeatedly performs a pass N times (where N is an integer that is equal to or larger than 2) for one line on a predetermined medium. The pass is a process to discharge liquid from one or more nozzles. The liquid discharging apparatus includes a head that is provided with a plurality of nozzles and an obtaining unit that obtains, for each of the plurality of nozzles, liquid discharge data indicating which pass is used to discharge the liquid in which position. The apparatus also includes a judging unit that determines, for each of the plurality of nozzles, whether or not an idle pass will exist in each of all the plurality of nozzles. The idle pass is a pass where liquid is not discharged from a nozzle of a head during a head stroke (hereinafter called an "idle pass"), based on the liquid discharge data. A liquid discharging unit is included that, when each of the plurality of nozzles is determined to have one or more idle passes, completes the one line by discharging the liquid while performing the pass M times (where M is an integer that is equal to or larger than 1 and less than N) for the one line on the predetermined medium.

With this apparatus, it is possible to reduce the number of passes by eliminating the idle passes. Consequently, it is possible to shorten the time period it takes to complete the liquid discharging process.

In some embodiments, the head of the liquid discharging apparatus is provided with a first group of nozzles that discharges a first liquid and a second group of nozzles that discharges a second liquid. When each of the plurality of nozzles does not have one or more idle passes, the liquid discharging unit is configured so that the second group of nozzles discharges the liquid at a second position, and the first group of nozzles discharges the liquid at a first position. When each of the plurality of nozzles has one or more idle passes, the liquid discharging unit is so configured that the second group of nozzles discharges the liquid at a third position that is different from the second position, and the first group of nozzles discharges the liquid at the first position.

In some embodiments, the liquid discharging apparatus is configured so that, when each group of the plurality of nozzles will have one or more idle passes, and where each of all the nozzles has no idle pass, the liquid discharging unit completes the one line by discharging the liquid while performing the pass M times on the predetermined medium.

In some embodiments, the liquid discharging apparatus further includes a changing unit that, in order to create an idle pass, changes a part of discharged positions indicated by the liquid discharge data.

In some embodiments, the changing unit obtains, with respect to a selected pass, a selected nozzle, from the liquid discharge data of the selected nozzle, a number of maximum cycles required by the selected nozzle to discharge the liquid in the selected pass and the number of actual cycles the selected nozzle actually discharges the liquid. The changing unit judges whether or not a ratio of the actual cycles to the maximum cycles is equal to or lower than a predetermined threshold value, and when the changing unit has determined that the ratio is equal to or lower than the predetermined threshold value, the changing unit may change a part of positions on which the selected nozzle is supposed to discharge the liquid in the selected pass.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be explained in detail below, with reference to the drawings.

Figure 1:
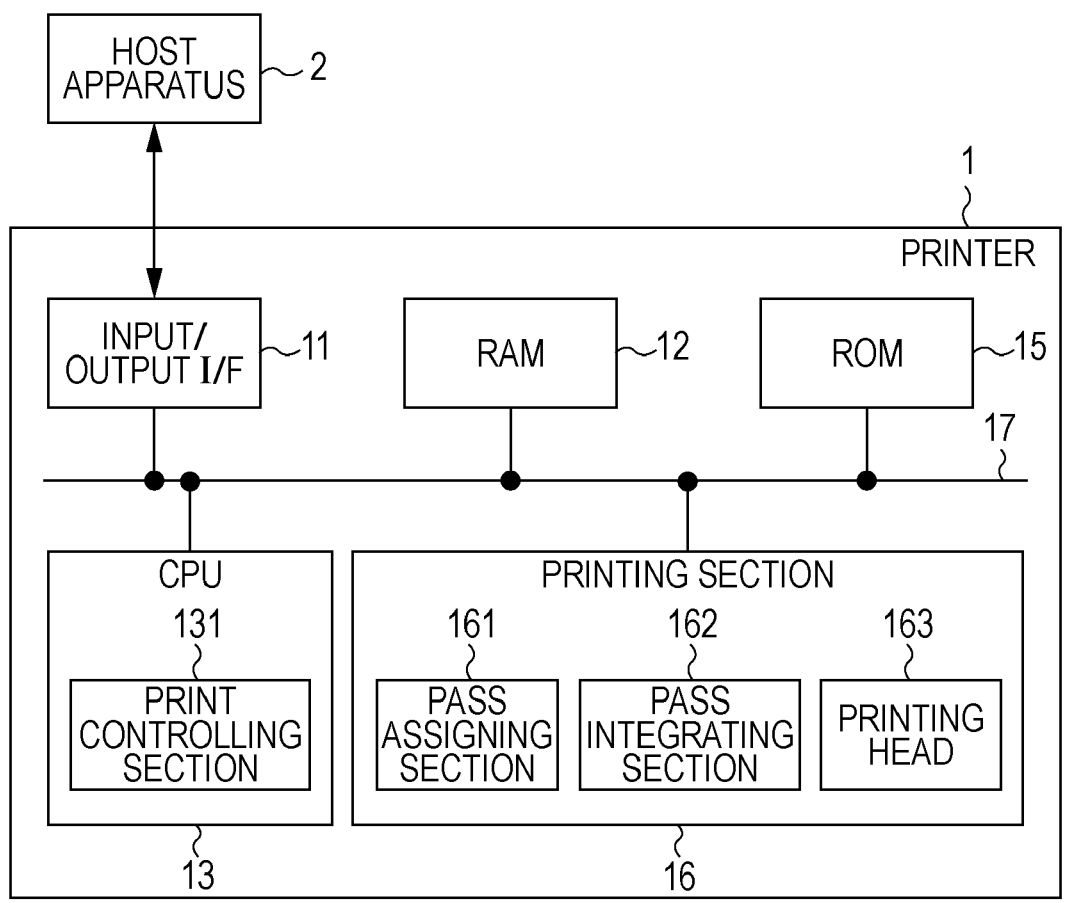
FIG. 1 is a diagram illustrating an exemplary configuration of a printer used as an example of a liquid discharging apparatus, according to an embodiment of the invention.

FIG. 1 a diagram illustrating an exemplary configuration of a printer 1 used as an example of a liquid discharging apparatus, according to an embodiment of the invention.

The printer 1 includes, for example, an input/output I/F (interface) 11, a RAM (Random Access Memory) 12, a ROM (Read Only Memory) 15, a CPU (Central Processing Unit) 13, and a printing section 16. The CPU 13, the ROM 15, the RAM 12, the input/output I/F 11, and the printing section 16 are connected to one another via, for example, a bus 17.

The ROM 15 stores, for example, various types of computer programs executed by the CPU 13, such as, in some embodiments, computer programs for performing the processes disclosed herein. The RAM 12 is used as a buffer that temporarily stores data to be processed by the CPU 13 such as, for example, printing job data that has been received from a host apparatus 2 and raster data obtained by rasterizing the received printing job data.

The input/output I/F 11 is an interface device used for performing data communication with the host apparatus 2. The input/output I/F 11 receives the printing job data, which indicates the contents of the printing job, from the host apparatus 2 and writes the received printing job data (hereinafter, the "received job data") into the RAM 12.

By executing the various types of computer programs stored in the ROM 15, the CPU 13 functions as, for example, a print controlling section 131. The print controlling section 131 is a processing section that controls the printing section 16 so that the printing section 16 outputs an image based on the received job data onto an image forming medium. More specifically, the print controlling section 131 reads the received job data stored in the RAM 12 and generates raster data by rasterizing the received job data that has been read. The print controlling section 131 then causes the printing section 16 to output the image based on the generated raster data. As a result, the image based on the received job data is output to the image forming medium.

The printing section 16 is a device that outputs a specified image (i.e., the image based on the raster data that has been input thereto) onto a recording medium such as, for example, a sheet of paper, an OHP sheet, a sheet of cardboard, or an envelope. The printing section 16 includes, for example, a pass assigning section 161, a pass integrating section 162, and a printing head 163 provided with a plurality of nozzles. The pass assigning section 161 and the pass integrating section 162 may each be installed as a dedicated hardware circuit. Alternatively, the pass assigning section 161 and the pass integrating section 162 may be implemented as software loaded in the ROM 15, or another memory, and executable by the CPU 13, or another processor, to cause the printer 1 to perform the processes disclosed herein. The printing head 163 is provided with a plurality of nozzle arrays in each of which a plurality of nozzles are arranged. Each of the nozzle arrays corresponds to one of different colors. The plurality of nozzle arrays are arranged in a row in a direction that intersects the direction in which the nozzles are arranged in each of the nozzle arrays.

According to one embodiment, the printing section 16 is configured so as to print one line of dots along the scanning direction of a carriage (hereinafter, simply referred to as the "scanning direction") on which the printing head 163 is mounted, by forming the dots on a recording medium with the ink discharged from one or more of the nozzles included in the printing head 163, while causing the carriage to repeat a carriage movement a plurality of times. The printing operation that is performed while the carriage makes a carriage movement one time according to this printing method will be referred to herein as a "pass". The number of times the pass is repeated in order to complete any one line of dots will be referred to herein as a "divided pass number". The printing process that uses this printing method (i.e., the printing process that uses multiple passes) will be referred to herein as a "multiple-pass printing process". According to one embodiment, the print controlling section 16 prints each of the passes in the multiple-pass printing process with a resolution of 360 dpi. The printing resolution for each of the passes will be referred to herein as the "pass resolution". Accordingly, by performing the multiple-pass printing process while setting the divided pass number to 4, for example, the printing section 16 is able to print with a resolution of 1440 dpi (=360 dpi×4 times). It should be understood, however, that the pass resolution and the divided pass number are not limited to the values described herein (i.e., 360 dpi and 4 times). It is possible to set the pass resolution and the divided pass number to any needed values.

Figure 2:
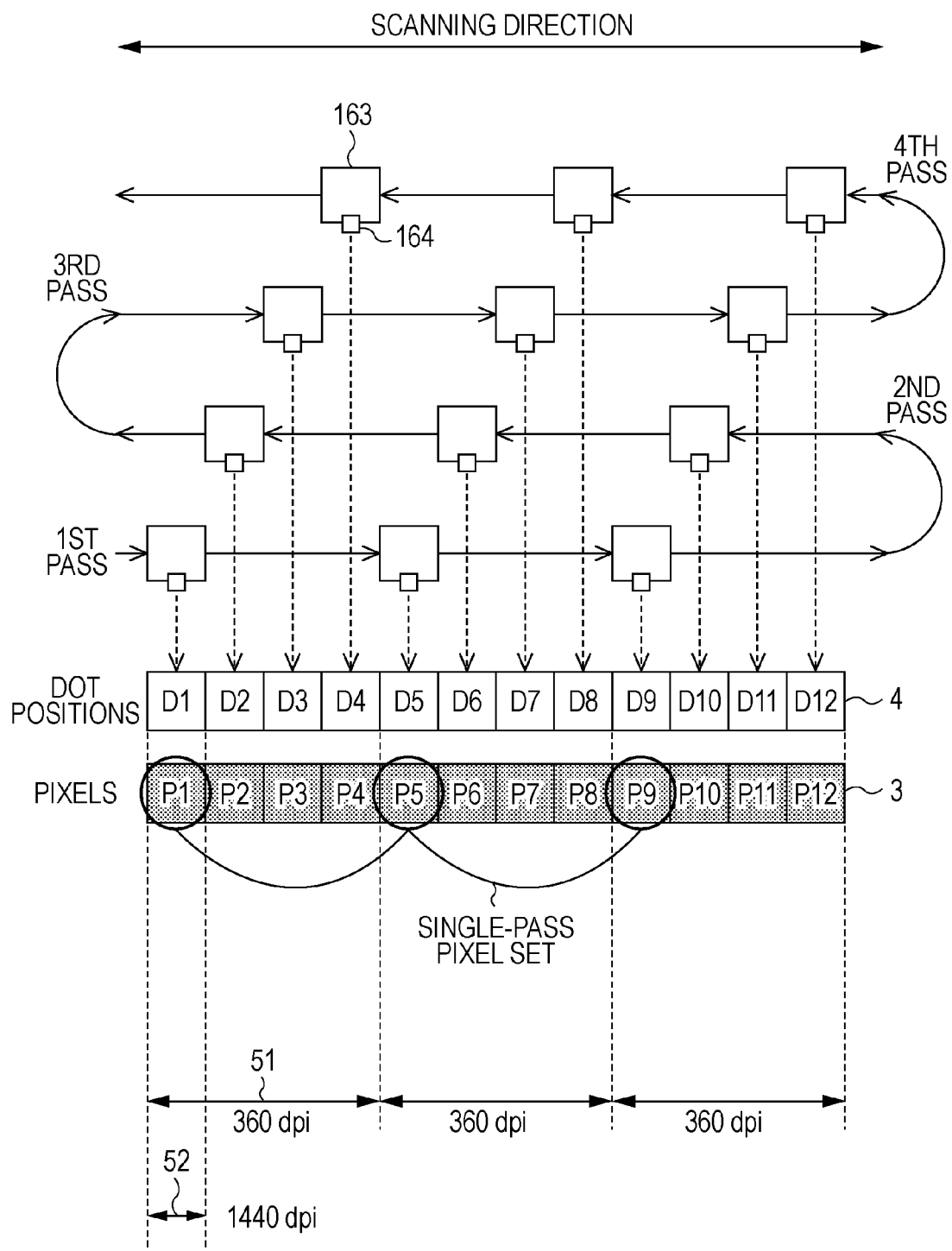
FIG. 2 is a schematic diagram of an overview of a multiple-pass printing process according to an embodiment of the invention.

FIG. 2 is a schematic diagram of an overview of the multiple-pass printing process.

In FIG. 2, the reference numeral 3 denotes raster data (i.e., raster data corresponding to one line). The resolution of the raster data 3 shown in FIG. 2 is 1440 dpi. In this simplistic example the raster data 3 contains twelve pieces of pixel data (i.e., P1 to P12). Each of the pieces of pixel data is data indicating whether a dot should be formed or the space should be left blank (i.e., no dot should be formed) for the corresponding pixel.

The reference numeral 4 denotes positions on the recording medium that correspond to the pixels in the raster data 3 (i.e., the positions on the recording medium in each of which the printing section 16 actually forms a dot; hereinafter, the "dot positions").

For example, in the case where each of all the pieces of pixel data (i.e., P1 to P12) contained in the raster data 3 is data indicating that a dot should be formed, the printing section 16 performs the multiple-pass printing process in the manner described below and outputs the image based on the raster data 3 onto the recording medium.

First, the printing section 16 determines the divided pass number (i.e., the number of times the pass needs to be repeated). Normally, the value obtained by dividing the resolution of the raster data 3 by the pass resolution is the minimum value of the divided pass number. The printing section 16 may determine the minimum value (i.e., the value obtained by dividing the resolution of the raster data 3 by the pass resolution) as the divided pass number. In one embodiment, because the pass resolution is 360 dpi and the resolution of the raster data 3 is 1440 dpi, the divided pass number is determined as 4 (1440 dpi/360 dpi).

Subsequently, the pass assigning section 161 included in the printing section 16 determines, for each of the pixels in the raster data 3, which one of the passes will be used to print the pixel (i.e., which one of the passes will be used to form the dot). For example, the pass assigning section 161 determines that a set made up of a plurality of pixels, that have been selected so as to have pixel intervals 51 therebetween, should be printed in one pass, the pixel intervals 51 corresponding to the pass resolution (i.e., 360 dpi in the embodiment). More specifically, the pixel intervals 51 are the intervals between the dots when the dots are formed according to the pass resolution. The set made up of the plurality of pixels that is determined to be printed in one pass will be referred to as a "single-pass pixel set" in the followings. For each of the single-pass pixel sets, the pass assigning section 161 determines which one of the passes (e.g., the first pass, the second pass, or the like) will be used to print the single-pass pixel set. In other words, the pass assigning section 161 determines an ID number identifying the pass (hereinafter, the "pass ID number") that will be used to print each of the single-pass pixel sets. In the example shown in FIG. 2, the pass assigning section 161 can specify, for example, a set made up of P1, P5, and P9 as a single-pass pixel set and determine that this single-pass pixel set will be printed in the first pass. Also, the pass assigning section 161 can specify a set made up of P2, P6, and P10 as another single-pass pixel set and determine that this single-pass pixel set will be printed in the second pass. Similarly, the pass assigning section 161 can specify a set made up of P3, P7, and P11 as yet another single-pass pixel set and determine that this single-pass pixel set will be printed in the third pass and specify a set made up of P4, P8, and P12 as yet another single-pass pixel set and determine that this single-pass pixel set will be printed in the fourth pass. Hereinafter, the process performed by the pass assigning section 161 described above (i.e., the process to determine which one of the passes will be used to print each of the pixels included in the raster data 3) will be referred to as a "pass assigning process".

Subsequently, according to the result of the pass assigning process, the printing section 16 performs the multiple-pass printing process. In other words, as shown in FIG. 2, the printing section 16 forms dots on the dot positions corresponding to P1, P5, and P9 in the first pass. More specifically, while the printing head 163 moves from the dot position D1 to the dot position D12 over the recording medium, the printing section 16 discharges ink from a nozzle 164 toward each of these dot positions, when passing through the positions that correspond to the dot positions D1, D5, and D9, respectively. The same applies to the second pass and thereafter. In other words, in the second pass, the printing section 16 forms dots on the dot positions that correspond to P2, P6, and P10, respectively. In the third pass, the printing section 16 forms dots on the dot positions that correspond to P3, P7, and P11, respectively. In the fourth pass, the printing section 16 forms dots on the dot positions that correspond to P4, P8, and P12, respectively. As a result, the image based on the raster data 3 is printed on the recording medium. As explained here, by performing the multiple-pass printing process, the printing section 16 is able to print with a resolution (i.e., 1440 dpi in the example shown in FIG. 2) that is higher than the resolution (i.e., 360 dpi in the embodiment) that can be achieved in a printing process performed under normal control. In other words, in the printing process performed under normal control, the printing section 16 is not able to form the dots consecutively at intervals that are shorter than the predetermined pixel intervals (i.e., the pixel intervals 51 corresponding to 360 dpi, in the embodiment). However, by performing the multiple-pass printing process, the printing section 16 is able to form the dots at such shorter intervals (i.e., the pixel intervals 52 corresponding to 1440 dpi, in the example shown in FIG. 2).

Returning to the description of FIG. 1, the pass integrating section 162 is a processing section that reduces the divided pass number that has been determined by the pass assigning section 161, in the multiple-pass printing process described above. As explained above, normally, the value obtained by dividing the resolution of the raster data 3 by the pass resolution is the minimum value of the divided pass number. The pass integrating section 162 is configured so as to be able to reduce the divided pass number that has been determined by integrating some of the passes. The pass integrating section 162 is thus able to shorten the processing time in the multiple-pass printing process. Hereinafter, the process performed by the pass integrating section 162 to reduce the divided pass number by integrating some of the passes will be referred to as a "pass integrating process", as will be explained more specifically.

Figure 3:
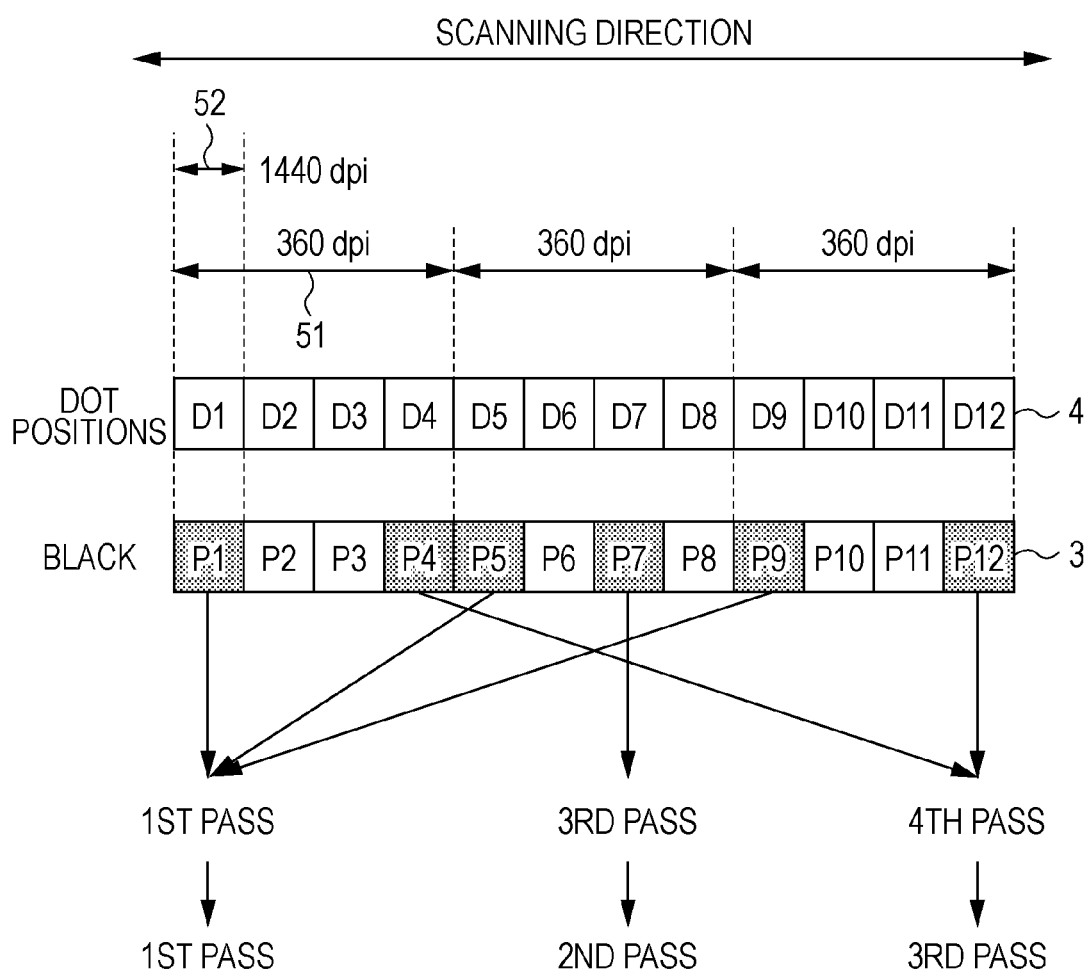
FIG. 3 is a schematic diagram of a pass integrating process in which a single color is used, according to an embodiment of the invention.

FIG. 3 is a schematic diagram of the pass integrating process in an example in which a single color is used.

FIG. 3 illustrates an example in which the printing section 16 prints by using a single color (i.e., black). Of the pixels in the raster data 3, each of the pixels that are colored gray is a pixel in which a dot is to be formed, whereas each of the pixels that are white is a pixel in which no dot is to be formed. In other words, the raster data 3 indicates that, for each of the pixels P1, P4, P5, P7, P9, and P12, a dot is to be formed on the corresponding one of the dot positions (i.e., D1, D4, D5, D7, D9, and D12).

In the example shown in FIG. 3 also, because the pass resolution is 360 dpi, whereas the resolution of the raster data 3 is 1440 dpi, and the number of pixels in the raster data 3 is 12, as in the example shown in FIG. 2, the pass assigning section 161 is able to perform the pass assigning process in the same manner as explained with reference to FIG. 2. In other words, the pass assigning section 161 is able to determine that the single-pass pixel set made up of P1, P5, and P9 will be printed in the first pass, that the single-pass pixel set made up of P2, P6, and P10 will be printed in the second pass, that the single-pass pixel set made up of P3, P7, and P11 will be printed in the third pass, and that the single-pass pixel set made up of P4, P8, and P12 will be printed in the fourth pass.

In the example shown in FIG. 3, however, each of the pixels P2, P3, P6, P8, P10, and P11 is a pixel in which no dot will be formed. Thus, in actuality, by performing the pass assigning process described above, the pass assigning section 161 has determined that the single-pass pixel set made up of P1, P5, and P9 will be printed in the first pass, that the single-pass pixel set made up of P7 will be printed in the third pass, and that the single-pass pixel set made up of P4 and P12 will be printed in the fourth pass. When the pass assigning section 161 has determined the passes in this manner, there is no pixel that will be printed in the second pass, in actuality. Thus, the second pass will be a pass with no dot forming. In other words, although the carriage makes a carriage movement, no dot will be formed in the second pass; such a pass will be referred to as an "idle pass" herein.

In this situation, the pass integrating section 162 changes the pass ID numbers of the single-pass pixel sets (i.e., the ID numbers identifying the passes in which the single-pass pixel sets are to be printed) so as to avoid the situation where no dot forming is performed in the second pass (i.e., so as to eliminate the idle pass). More specifically, for example, the pass integrating section 162 makes changes so that the single-pass pixel set made up of P7 will be printed in the second pass, whereas the single-pass pixel set made up of P4 and P12 will be printed in the third pass. With this arrangement, it is possible to avoid the situation where no dot forming is performed in the second pass (i.e., to eliminate the idle pass) and to complete the output of the image based on the raster data 3 in the first, second, and the third passes. Accordingly, there is no need to perform the fourth pass, and it is therefore possible to reduce the divided pass number from 4 to 3. If the divided pass number has become 3 or less for each of all the nozzles in the nozzle array corresponding to the single color (i.e., black) in the printing head 163 as a result of the pass integrating process, it is possible to omit the carriage movement corresponding to one time for the printing head as a whole. Consequently, it is possible to reduce the printing time period corresponding to the carriage movement. As additional information, the nozzles that are used to form the dots in the first, the second, and the third passes may be the same. Alternatively, the nozzles that are used to form the dots in those passes may be different.

Figure 4:
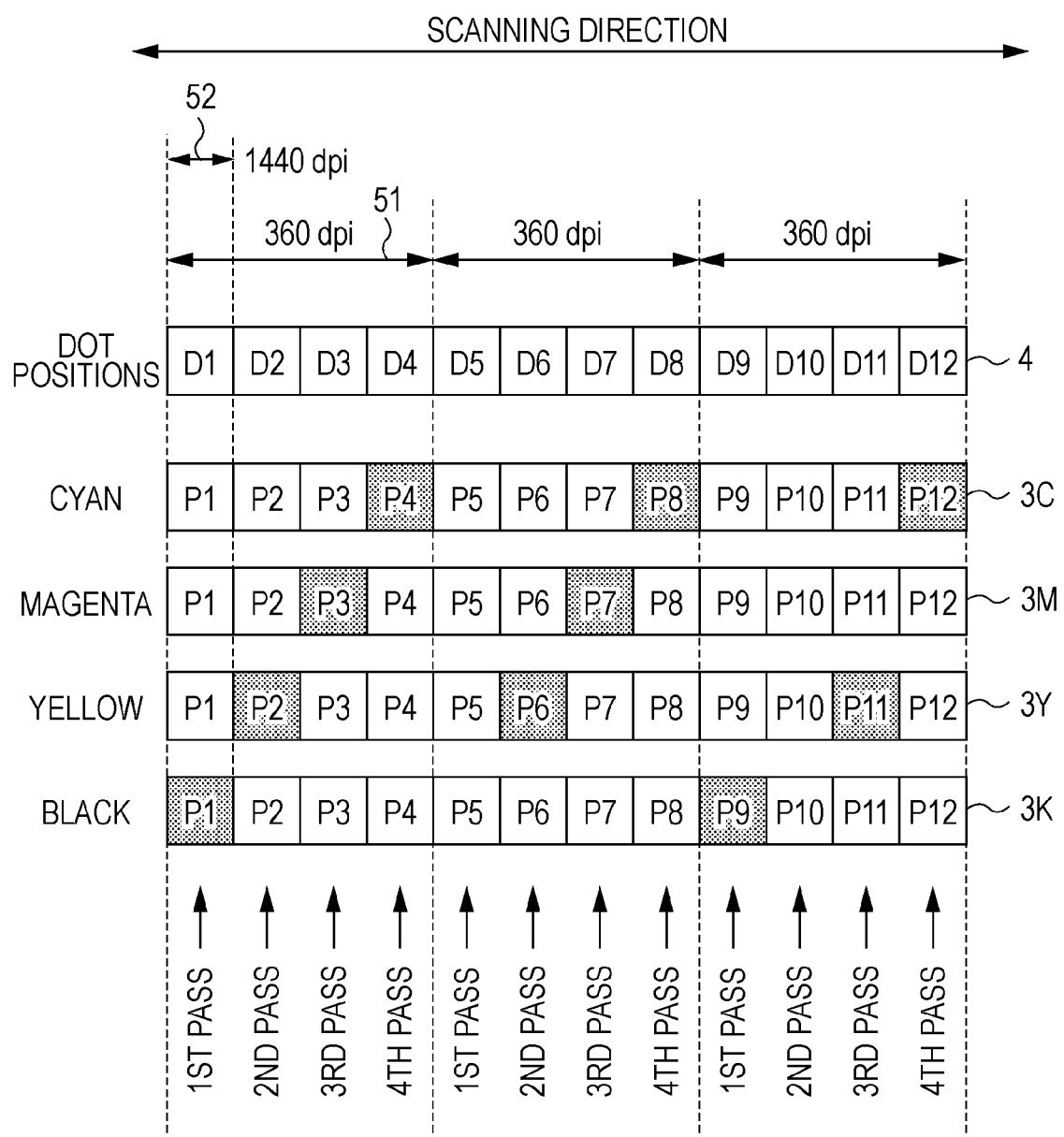
FIG. 4 is a schematic diagram of a pass integrating process in which multiple colors are used, according to an embodiment of the invention.

FIG. 4 is a schematic diagram of the pass integrating process in an example in which multiple colors are used.

FIG. 4 illustrates an example in which the printing section 16 prints by using multiple colors (i.e., four colors such as cyan, magenta, yellow, and black). Like in the example shown in FIG. 3, of the pixels in the raster data 3 (i.e., 3C, 3M, 3Y, and 3K), each of the pixels that are colored gray is a pixel in which a dot is to be formed, whereas each of the pixels that are white is a pixel in which no dot is to be formed. In other words, the pieces of raster data 3C, 3M, 3Y, and 3K shown in FIG. 4 indicate that, for the pixels P4, P8, and P12 in cyan, for the pixels P3 and P7 in magenta, for the pixels P2, P6, and P11 in yellow, and for the pixels P1 and P9 in black, a dot is to be formed in the corresponding one of the dot positions.

In the example shown in FIG. 4 also, because the pass resolution is 360 dpi, whereas the resolution of the raster data 3 is 1440 dpi, and the number of pixels in the raster data 3 is 12. as in the example shown in FIG. 2, the pass assigning section 161 is able to perform the pass assigning process in the same manner as explained with reference to FIG. 2. In other words, the pass assigning section 161 is able to determine that the single-pass pixel set made up of P1, P5, and P9 will be printed in the first pass, that the single-pass pixel set made up of P2, P6, and P10 will be printed in the second pass, that the single-pass pixel set made up of P3, P7, and P11 will be printed in the third pass, and that the single-pass pixel set made up of P4, P8, and P12 will be printed in the fourth pass.

In the case where the pass assigning process has been performed as described above, the situation for each of the colors can be explained as follows: for cyan, the single-pass pixel set made up of P4, P8, and P12 will be printed in the fourth pass; for magenta, the single-pass pixel set made up of P3 and P7 will be printed in the third pass; for yellow, the single-pass pixel set made up of P2 and P6 will be printed in the second pass, whereas the single-pass pixel set made up of P11 will be printed in the third pass; for black, the single-pass pixel set made up of P1 and P9 will be printed in the first pass. In other words, for cyan, the pixels will be printed only in the fourth pass, whereas the first, the second, and the third passes will be idle passes. For magenta, the pixels will be printed only in the third pass, whereas the first, the second, and the fourth passes will be idle passes. For yellow, the pixels will be printed only in the second and the third passes, whereas the first and the fourth passes will be idle passes. For black, the pixels will be printed only in the first pass, whereas the second, the third, and the fourth passes will be idle passes.

In the case where multiple colors are used, for each of the colors, ink is discharged from a nozzle 164 arranged in a different array to each other. As explained above, in one embodiment, the resolution that can be achieved by the printing section 16 in a printing process performed under the normal control is 360 dpi. (In other words, the printing section 16 is able to form dots at the pixel intervals 51 corresponding to the resolution of 360 dpi.) However, this is a limitation for each of the nozzles 164 or for each of the nozzle arrays. Thus, the nozzle array and the nozzle 164 from which the ink is discharged are different for each of the different colors. Consequently, by changing the timing at which the ink is discharged from the nozzles 164, it is possible to consecutively form the dots in the different colors at intervals that are shorter than the pixel intervals 51 corresponding to the resolution of 360 dpi. To explain more specifically with the example shown in FIG. 4, in the first pass, for example, it is possible to form the dots in the pixels P1 and P9 by using a black nozzle 164, to form the dots in the pixels P2 and P6 by using a yellow nozzle 164, to form the dots in the pixels P3 and P7 by using a magenta nozzle 164, and to form the dots in the pixels P4, P8, and P12 by using a cyan nozzle 164.

In the case where multiple colors are used, the pass integrating section 162 performs the pass integrating process so that the number of idle passes for each of the colors becomes as small as possible, while taking the feature described above (i.e., different colors can be printed in a consecutive manner) into consideration. The details of the pass integrating process that is performed in an example in which multiple colors are used will be explained, with reference to FIG. 5.

Figure 5:
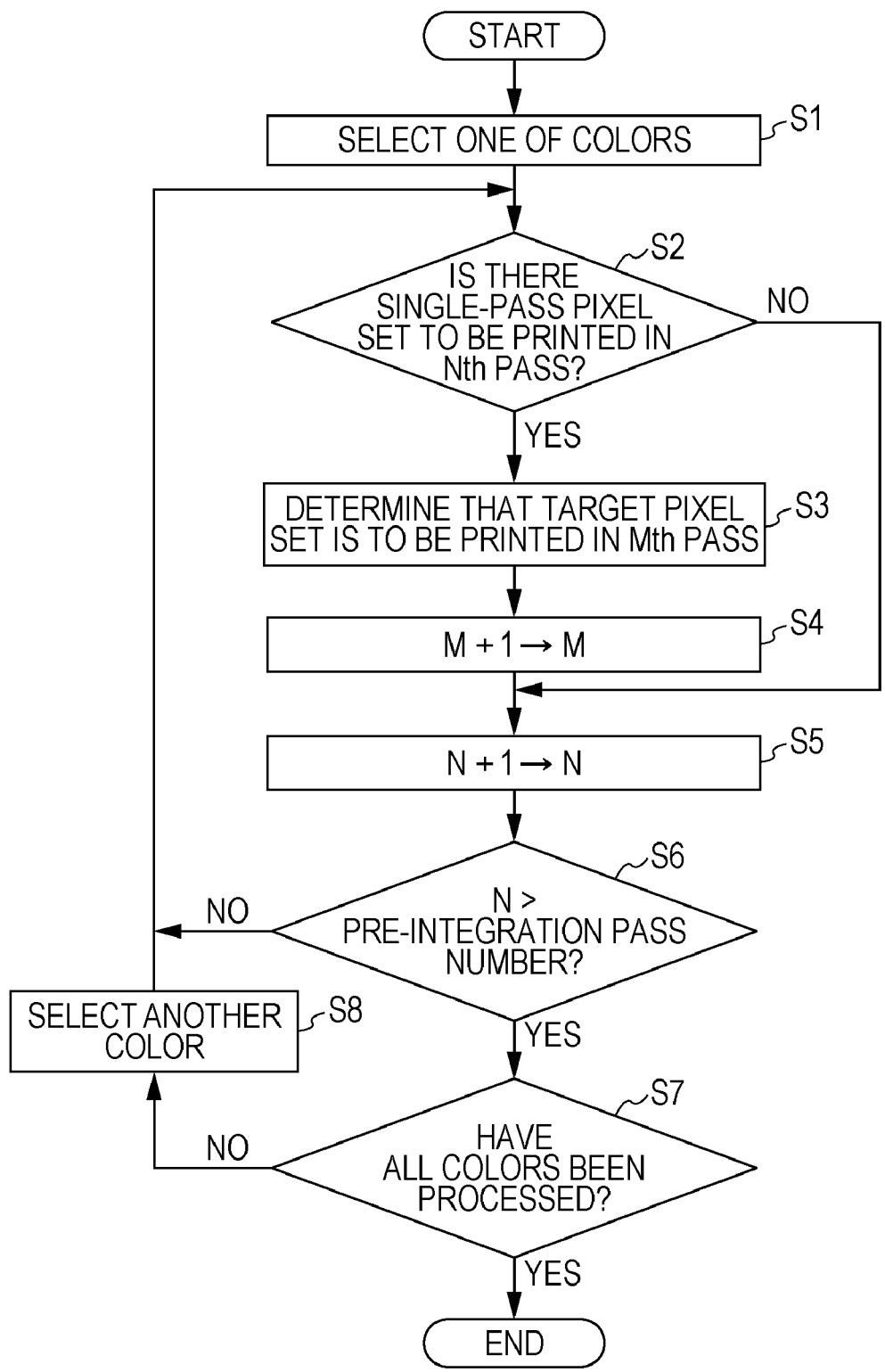
FIG. 5 is a flowchart of the pass integrating process in an example in which multiple colors are used, according to an embodiment of the invention.

FIG. 5 is a flowchart of the pass integrating process in an example in which multiple colors are used.

The pass integrating process is performed after the pass assigning process has been performed. In the followings, a divided pass number that has been determined in the pass assigning process (i.e., a divided pass number before the pass integrating process is performed) will be referred to as a "pre-integration pass number", whereas a divided pass number after the pass integrating process is performed (i.e., a divided pass number that has been reduced as a result of the pass integrating process) will be referred to as a "post-integration pass number". Further, with respect to a given single-pass pixel set, the pass ID number for the single-pass pixel set that has been determined in the pass assigning process will be referred to as a "pre-integration pass ID number", whereas the pass ID number for the single-pass pixel set that has been determined in the pass integrating process will be referred to as a "post-integration pass ID number".

Further, N denotes a variable used for counting values from 1 to a pre-integration pass number. M is a variable used for storing therein a pass ID number that is to be newly assigned to a single-pass pixel set (i.e., a post-integration pass ID number). The initial value of each of the variables N and M may be "1".

First, the pass integrating section 162 selects one of the colors (S1). In the followings, the color that has been selected will be referred to as a "selected color".

Subsequently, the pass integrating section 162 determining, for the selected color, whether or not there is a single-pass pixel set (that is made up of only the pixels in each of which a dot is to be formed) determined from the pass assigning process, to be printed in an Nth pass (S2). Because the initial value of N is "1", it is first determined whether or not a single-pass pixel set was designated, during the pass assigning process, to be printed in the first pass. For instance, in the example shown in FIG. 4, in the case where the selected color is black, the single-pass pixel set that has been determined to be printed in the first pass is made up of P1 and P9. Accordingly, it is determined that there is a single-pass pixel set that has been determined to be printed in the first pass. In contrast, in the case where the selected color is cyan, magenta, or yellow, it is judged that there is no single-pass pixel set that has been determined to be printed in the first pass.

When a single-pass pixel set is determined to be printed in the Nth pass (S2: Yes), the pass integrating section 162 determines that this single-pass pixel set (hereinafter, the "target pixel set") that was designated to be printed out in the Nth pass should now be printed in an Mth pass (S3). The pass integrating section 162 then stores the target pixel set (i.e., the numerals identifying the pixels that are included in the target pixel set) and the value of M (i.e., the post-integration pass ID number) into the RAM 12, while keeping them in correspondence with each other. After that, the values of M and N are each incremented by 1 (S4 and S5), and the process at S6 is performed.

In contrast, when no single-pass pixel set was determined to be printed in the Nth pass (S2: No), the value of N is incremented by 1 (S5), and the process at S6 is performed.

At S6, the pass integrating section 162 determines whether or not the value of N is larger than the pre-integration pass number.

When the value of N is not larger than the pre-integration pass number (S6: No), the pass integrating section 162 performs the process at S2 again.

In contrast, when the value of N is larger than the pre-integration pass number (S6: Yes), the pass integrating section 162 determines whether or not the processes at S2 to S6 have been performed for each of all the four colors (S7).

When the processes at S2 to S6 have not been performed for all the four colors (S7: No), the pass integrating section 162 selects another color (S8), and performs the processes at S2 to S6 for the color that has been selected (i.e., the selected color).

In contrast, when the processes at S2 to S6 have been performed for each of all the four colors (S7: Yes), the pass integrating process is completed.

The processes performed for each of the colors will now be more specifically described with reference to the flowchart described above, with reference to the example shown in FIG. 4.

First, the processes for black (i.e., an example in which the selected color is black) will be detailed. In the judging process at S2, that is performed while N=1 is satisfied, the single-pass pixel set has been determined, during the pass assigning process, to be printed in the first pass is made up of P1 and P9, as described above. Accordingly, it is determined that there is a single-pass pixel set that was designated to be printed in the Nth pass. Consequently, at S3, the target pixel set (i.e., P1 and P9) is modified to be printed in the Mth pass (i.e., the first pass because the initial value of M is 1). However, in this situation, the single-pass pixel set made up of P1 and P9 was designated to be printed in the first pass, which means that the decision is the same for both before and after the pass integrating process. When N=2, 3, and 4, because there in no single-pass pixel set to be printed, the process proceeds to another color, which is yellow.

Next, the processes for yellow will be detailed. In the judging process at S2 that is performed while N=1 is satisfied, it is judged, as described above, that there is no single-pass pixel set that was designated, during the pass assigning process, to be printed in the first pass. Accordingly, at S5, the value of N is incremented by 1 so as to become 2. Subsequently, because the value of N (i.e., 2) is not larger than the pre-integration pass number (i.e., 4), the process at S2 is performed again. In the process at S2, that is performed when N=2, the single-pass pixel set, that was designated, during the pass assigning process, to be printed in the second pass is made up of P2 and P6. Accordingly, it is determined that there is a single-pass pixel set that was designated to be printed in the Nth pass. Consequently, at S3, the target pixel set (i.e., P2 and P6) is modified to be printed in the Mth pass (i.e., the first pass because the initial value of M is 1 and has not been incremented yet). In other words, the pass ID number for the single-pass pixel set made up of P2 and P6 is changed from 2 (i.e., the second pass) to 1 (i.e., the first pass). After that, at S4 and S5, the values of N and M are each incremented by 1 so that N=3 and M=2. In this situation, because the value of N (i.e., 3) is not larger than the pre-integration pass number (i.e., 4), the process at S2 is performed again. In the process at S2 that is performed when N=3, the single-pass pixel set that was designated, during the pass assigning process, to be printed in the third pass is made up of P11. Accordingly, it is determined that there is a single-pass pixel set that was designated to be printed in the Nth pass. Consequently, at S3, the target pixel set (i.e., P11) is modified to be printed in the Mth pass (i.e., the second pass). In other words, the pass ID number for the single-pass pixel set made up of P11 is changed from 3 (i.e., the third pass) to 2 (i.e., the second pass). When N=4, because there is no single-pass pixel set to be printed, the process proceeds to another color, which is magenta.

Next, the processes for magenta (i.e., an example in which the selected color is magenta) will be detailed. In the process at S2 that is performed when N=1, it is determined, as described above, that there was no single-pass pixel set, designated during the pass assigning process, to be printed in the first pass. Accordingly, at S5, the value of N is incremented by 1 so as to become 2. Subsequently, because the value of N (i.e., 2) is not larger than the pre-integration pass number (i.e., 4), the process at S2 is performed again. Also, in the process at S2 that is performed when N=2, it is determined that no single-pass pixel set was designated, during the pass assigning process to be printed in the second pass. Accordingly, at S5, the value of N is incremented by 1 so as to become 3. Subsequently, because the value of N (i.e., 3) is not larger than the pre-integration pass number (i.e., 4), the process at S2 is performed again. In the process at S2 that is performed when N=3, the single-pass pixel set, that was designated during the pass assigning process, to be printed in the third pass is made up of P3 and P7. Accordingly, it is determined that there is a single-pass pixel set that was designated to be printed in the Nth pass. Consequently, at S3, the target pixel set (i.e., P3 and P7) is modified to be printed in the Mth pass (i.e., the first pass because the initial value of M is 1 and has not been incremented yet). In other words, the pass ID number for the single-pass pixel set made up of P3 and P7 is changed from 3 (i.e., the third pass) to 1 (i.e., the first pass). When N=4, because there is no single-pass pixel set to be printed, the process proceeds to another color, which is cyan.

Lastly, the processes for cyan (i.e., an example in which the selected color is cyan) will be detailed. In the process at S2 that is performed when N=1, it is determined, as described above, that there was no single-pass pixel set designated, during the pass assigning process, to be printed in the first pass. Accordingly, at S5, the value of N is incremented by 1 so as to become 2. Subsequently, because the value of N (i.e., 2) is not larger than the pre-integration pass number (i.e., 4), the process at S2 is performed again. In the process at S2 that is performed when N=2, it is determined that no single-pass pixel set was designated, during the pass assigning process, to be printed in the second pass. Accordingly, at S5, the value of N is incremented by 1 so as to become 3. Subsequently, because the value of N (i.e., 3) is not larger than the pre-integration pass number (i.e., 4), the process at S2 is performed again. Also, in the process at S2 that is performed when N=3, it is determined that there was no single-pass pixel set designated, during the pass assigning process to be printed in the third pass. Accordingly, at S5, the value of N is incremented by 1 so as to become 4. Subsequently, because the value of N (i.e., 4) is not larger than the pre-integration pass number (i.e., 4), the process at S2 is performed again. Further, in the process at S2 that is performed when N=4, the single-pass pixel set that was designated, during the pass assigning process, to be printed in the fourth pass is made up of P4, P8, and P12. Accordingly, it is determined that there is a single-pass pixel set designated to be printed in the Nth pass. Consequently, at S3, the target pixel set (i.e., 4, P8, and P12) is modified to be printed in the Mth pass (i.e., the first pass because the initial value of M is 1 and has not been incremented yet). In other words, the pass ID number for the single-pass pixel set made up of P4, P8, and P12 is changed from 4 (i.e., the fourth pass) to 1 (i.e., the first pass).

Figure 6:
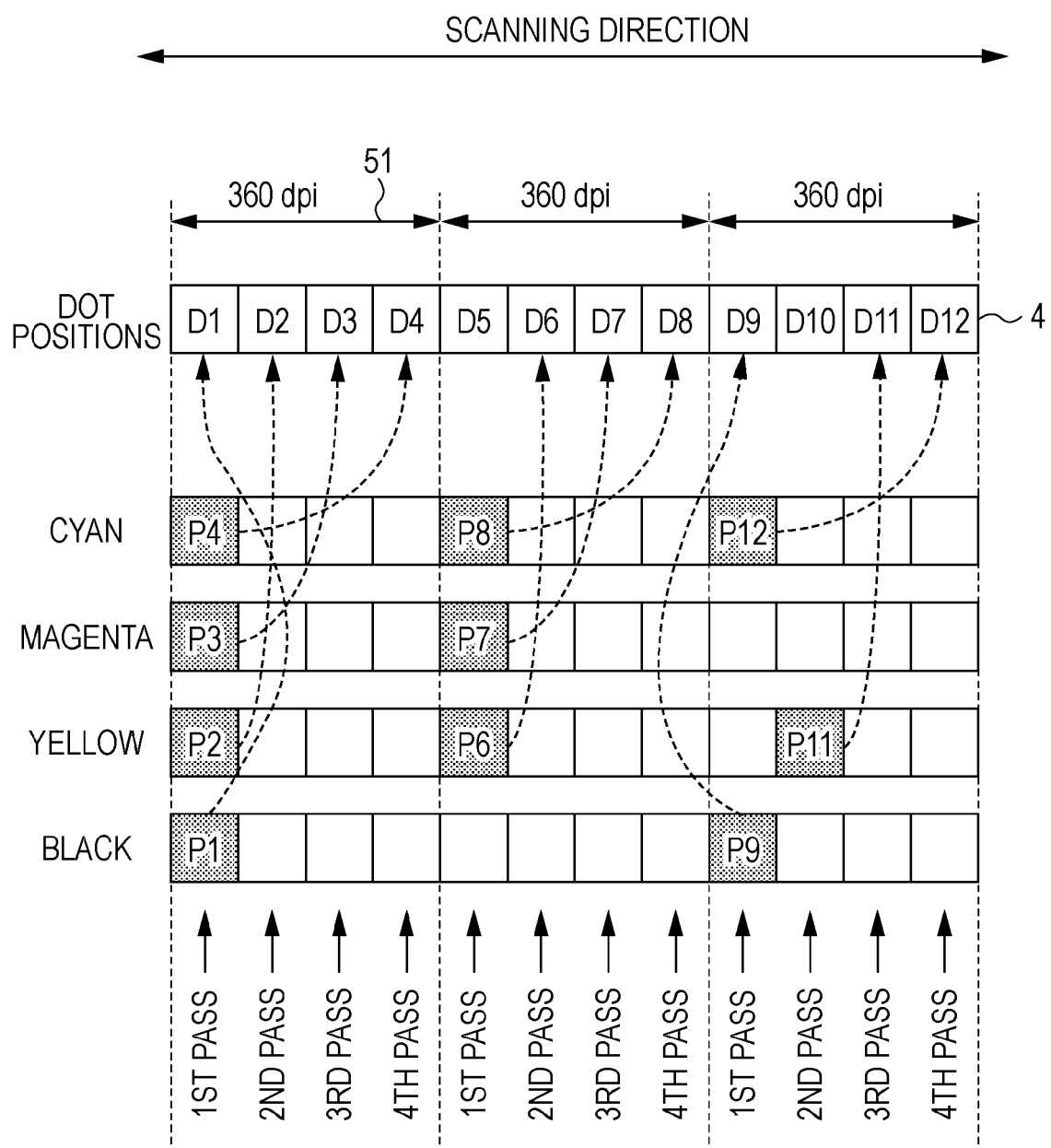
FIG. 6 is a schematic diagram illustrating an exemplary result of the pass integrating process performed in the example shown in FIG. 4, according to an embodiment of the invention.

FIG. 6 is a schematic diagram illustrating an exemplary result of the pass integrating process performed in the example shown in FIG. 4.

In FIG. 6, it is indicated, as a result of the pass integrating process described above, that the single-pass pixel set for cyan (i.e., P4, P8, and P12), the single-pass pixel set for magenta (i.e., P3 and P7), the single-pass pixel set for yellow (i.e., P2 and P6), and the single-pass pixel set for black (i.e., P1 and P9) have been modified to be printed in the first pass and that the other single-pass pixel set for yellow (i.e., P11) has been modified to be printed in the second pass. In other words, as a result of the pass integrating process, there is no longer any single-pass pixel set that is to be printed in the third pass and the fourth pass as was previously designated by the pass-assigning process. Accordingly, the output of the image based on the raster data 3 is completed in the first and the second passes. Consequently, there is no need to perform the third and the fourth passes, and it is therefore possible to reduce the divided pass number from 4 to 2.

In the followings, a manner in which the printing process is performed based on the result shown in FIG. 6 will be explained. As explained above, the single-pass pixel set for cyan (i.e., P4, P8, and P12), the single-pass pixel set for magenta (i.e., P3 and P7), the single-pass pixel set for yellow (i.e., P2 and P6), and the single-pass pixel set for black (i.e., P1 and P9) will be printed in the same pass, which is the first pass; however, the positions on which the dots are formed (i.e., the dot positions) are different from one another. In other words, for cyan, the dots need to be formed on the corresponding dot positions, which are namely D4, D8, and D12; for magenta, the dots need to be formed on the corresponding dot positions, which are namely D3 and D7; for yellow, the dots need to be formed on the corresponding dot positions, which are namely D2 and D6; and, for black, the dots need to be formed on the corresponding positions, which are namely D1 and D9 (see the arrows with broken lines in FIG. 6).

By staggering the timing at which the ink is discharged from the nozzles 164 for each of the colors, the printing section 16 is able to form the dots on the corresponding dot positions for each of the colors. The timing at which the ink is discharged for each of the colors will be explained with reference to FIG. 7.

Figure 7:
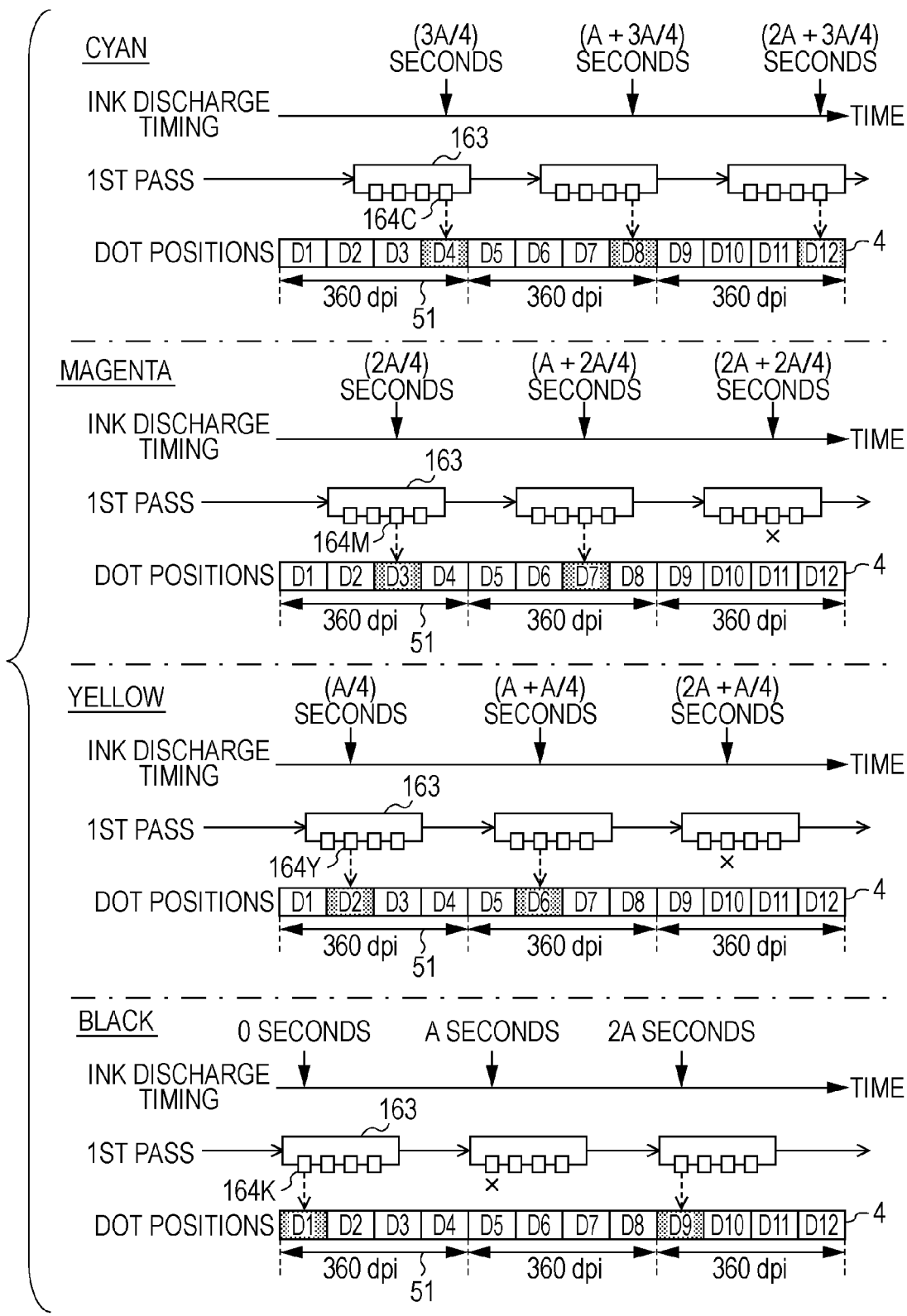
FIG. 7 is a schematic diagram illustrating timing at which ink is discharged, according to an embodiment of the invention.

FIG. 7 is a schematic diagram illustrating the timing at which the ink is discharged.

As shown in FIG. 7, the printing head 163 is provided with the plurality of nozzles 164 for discharging the ink in the different colors. The reference symbol 164K denotes a nozzle that discharges black ink; the reference symbol 164Y denotes a nozzle that discharges yellow ink; the reference symbol 164M denotes a nozzle that discharges magenta ink; and the reference symbol 164C denotes a nozzle that discharges cyan ink. In the followings, the timing at which the ink is discharged will be explained for each of the different colors. In one embodiment, the time period for the printing head 163 to travel the pixel interval 51 corresponding to the pass resolution (i.e., 360 dpi) is A seconds. In other words, each of the nozzles 164C, 164M, 164Y, and 164K is configured so as to be able to discharge the ink with an A-second cycle.

First, the processes for black will be detailed. For black, the timing at which it is possible to discharge the ink can be expressed as a time that is nA seconds (where n is an integer that is equal to or larger than 0) later than a reference time (hereinafter, the "black reference time") at which the black nozzle 164K passes through the dot position D1. With this setting, in the first pass, the black nozzle 164K is able to form a dot on each of the dot positions D1 (i.e., the dot position through which the nozzle 164K passes at the time that is 0 seconds later than the black reference time), D5 (i.e., the dot position through which the nozzle 164K passes at the time that is A seconds later than the black reference time), and D9 (i.e., the dot position through which the nozzle 164K passes at the time that is 2A seconds later than the black reference time). In the example shown in FIG. 6, the pixel P5 for black is a pixel in which no dot is formed. Thus, in actuality, the nozzle 164K forms a dot on D1 and on D9.

Next, the processes for yellow will be explained. For yellow, the timing at which it is possible to discharge the ink can be expressed as a time that is (nA+A/4) seconds (where n is an integer that is equal to or larger than 0) later than a reference time (hereinafter, the "first yellow reference time") at which the yellow nozzle 164Y passes through the dot position D1. With this setting, in the first pass, the yellow nozzle 164Y is able to form a dot on each of the dot positions D2 (i.e., the dot position through which the nozzle 164Y passes at the time that is (A/4) seconds later than the first yellow reference time), D6 (i.e., the dot position through which the nozzle 164Y passes at the time that is (A+A/4) seconds later than the first yellow reference time), and D10 (i.e., the dot position through which the nozzle 164Y passes at the time that is (2A+A/4) seconds later than the first yellow reference time). In the example shown in FIG. 6, the pixel P10 for yellow is a pixel in which no dot is formed. Thus, in actuality, the nozzle 164Y forms a dot on D2 and on D6.

For yellow, the dot on D11 is formed in the second pass. Although the second pass is not shown in the drawings, the printing head 163 moves from D12 toward D1. Thus, the timing at which it is possible to discharge the ink can be expressed as, for example, a time that is (nA+A/4) seconds (where n is an integer that is equal to or larger than 0) later than a reference time (hereinafter, the "second yellow reference time") at which the yellow nozzle 164Y passes through the dot position D12. With this setting, in the second pass, the yellow nozzle 164Y is able to form a dot on each of the dot positions D11 (i.e., the dot position through which the nozzle 164Y passes at the time that is (A/4) seconds later than the second yellow reference time), D7 (i.e., the dot position through which the nozzle 164Y passes at the time that is (A+A/4) seconds later than the second yellow reference time), and D3 (i.e., the dot position through which the nozzle 164Y passes at the time that is (2A+A/4) seconds later than the second yellow reference time).

Next, the processes for magenta will be explained. For magenta, the timing at which it is possible to discharge the ink can be expressed as a time that is (nA+2A/4) seconds (where n is an integer that is equal to or larger than 0) later than a reference time (hereinafter, the "magenta reference time") at which the magenta nozzle 164M passes through the dot position D1. With this setting, in the first pass, the magenta nozzle 164M is able to form a dot on each of the dot positions D3 (i.e., the dot position through which the nozzle 164M passes at the time that is (2A/4) seconds later than the magenta reference time), D7 (i.e., the dot position through which the nozzle 164M passes at the time that is (A+2A/4) seconds later than the magenta reference time), and D11 (i.e., the dot position through which the nozzle 164M passes at the time that is "2A+2A/4" seconds later than the magenta reference time). In the example shown in FIG. 6, the pixel P11 for magenta is a pixel in which no dot is formed. Thus, in actuality, the nozzle 164M forms a dot on D3 and on D7.

Lastly, the processes for cyan will be explained. For cyan, the timing at which it is possible to discharge the ink can be expressed as a time that is (nA+3A/4) seconds (where n is an integer that is equal to or larger than 0) later than a reference time (hereinafter, the "cyan reference time") at which the cyan nozzle 164C passes through the dot position D1. With this setting, in the first pass, the cyan nozzle 164C is able to form a dot on each of the dot positions D4 (i.e., the dot position through which the nozzle 164C passes at the time that is (3A/4) seconds later than the cyan reference time), D8 (i.e., the dot position through which the nozzle 164C passes at the time that is (A+3A/4) seconds later than the cyan reference time), and D12 (i.e., the dot position through which the nozzle 164C passes at the time that is (2A+3A/4) seconds later than the cyan reference time). In the example shown in FIG. 6, the nozzle 164C forms a dot on D4, on D8, and on D12.

As explained above, for each of the nozzles 164C, 164M, 164Y, and 164K respectively corresponding to the different colors, the timing (i.e., the cycle) with which the ink is discharged is set in correspondence with the dot positions on each nozzle which forms the dot. With this arrangement, it is possible to form the dots consecutively in each of the different colors at the intervals that are shorter than the pixel intervals 51 corresponding to the pass resolution (i.e., 360 dpi in the embodiment). Accordingly, in each pass, it is possible to process the consecutive dot positions on which the dots are formed in the different colors. Thus, it is possible to reduce the divided pass number by performing the pass integrating process as described above. Although the processes have been explained by using the example to print one line, the same can be extended to all the nozzles included in the printing head 163. In other words, the pass integrating process can be performed for each of the passes that respectively correspond to all the nozzles included in the printing head 163. As a result, for each of certain dots, it is possible to form the dot in a pass that is different from the pass in which the dot was originally designated to be formed. Thus, it is possible to reduce the divided pass number required in the printing process. Consequently, it is possible to omit the carriage movements corresponding to a plurality of times from the overall printing process and to shorten the printing time period corresponding to the omitted carriage movements. In the case where the ink is discharged in multiple passes, the nozzles that are used to form the dots in different passes may be the same. Alternatively, the nozzles that are used to form the dots in different passes may be different nozzles for the same color. In other words, in the example explained above, for yellow, the nozzles used in the first pass and the second pass may be the same. Alternatively, the yellow nozzles used in the first pass and the second pass may be different.

Next, a modification example of the pass integrating process will be explained, with reference to FIGS. 8 and 9.

Figure 8:
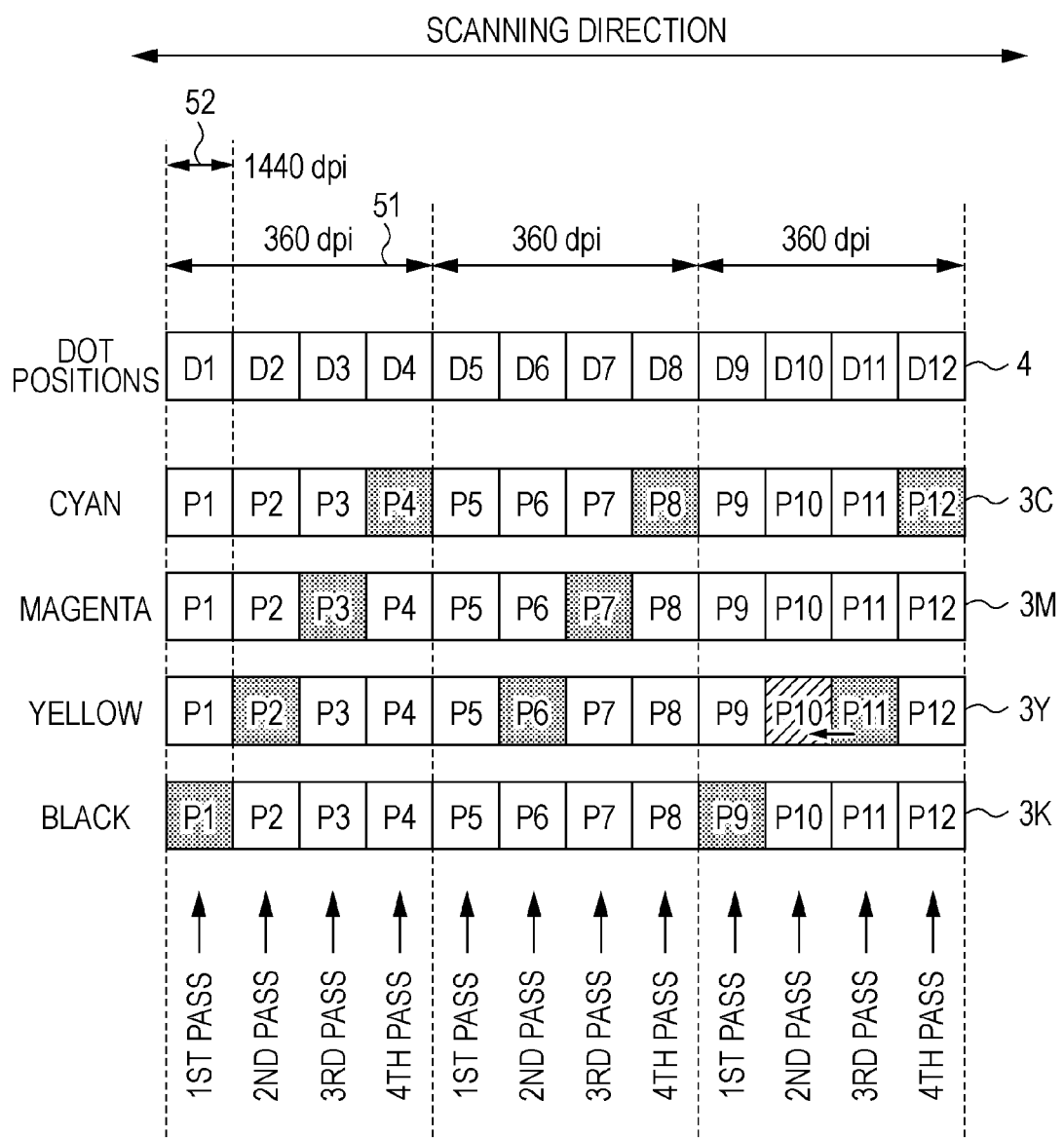
FIG. 8 is a schematic diagram illustrating a modification example of the pass integrating process, according to an embodiment of the invention.

According to the modification example applied to the example shown in FIG. 4, for yellow, the pass integrating section 162 determines P10 to be a pixel in which a dot is to be formed, instead of P11 (see FIG. 8). When this change has been made, because the pixel P10 is now included in the single-pass pixel set including the pixels P2 and P6 on each of which a dot is to be formed, it is possible to complete the printing in yellow, too, in one pass. As explained here, by changing the pixel in which a dot is to be formed (e.g., by changing the pixel to another pixel positioned adjacent thereto), the pass integrating section 162 is able to integrate a plurality of single-pass pixel sets into one single-pass pixel set. In the example described above, by changing the pixel in which a dot is to be formed from P11 to P10, the pass integrating section 162 is able to integrate the single-pass pixel set including P2 and P6, and the single-pass pixel set including P11, into one single-pass pixel set (i.e., the single-pass pixel set including P2, P6, and P10). In the followings, this process (i.e., the process to integrate a plurality of single-pass pixel sets into one single-pass pixel set by changing the pixel in which a dot is to be formed i.e., by changing the dot position on which the dot is to be formed) will be referred to as a "speed increasing process with a dot position change".

In the speed increasing process with a dot position change, for example, the pass integrating section 162 is able to determine the pixel that is used as the target of the change in the following manner. For as N pixels (that may include some pixels in which no dot is to be formed) belonging to a given single-pass pixel set, with as many as M pixels out of the N pixels are the pixels in which a dot is to be formed, the pass integrating section 162 determines that for each pixel of the quantity M is used as the target of the change, if the ratio of M (i.e., the number of pixels in each of which a dot is to be formed) to N (i.e., the number of pixels that belong to the given single-pass pixel set) is smaller than a predetermined threshold value. Note that the ratio can be expressed as M/N. This is explained more specifically by using the example for yellow described above. Three pixels belong to the single-pass pixel set made up of P3, P7, and P11. Of these three pixels, P11 is a pixel in which a dot is to be formed. Accordingly, if the ratio of the number of pixels in each of which a dot is to be formed (i.e., 1) to the number of pixels that belong to the single-pass pixel set made up of P3, P7, and P11 (i.e., 3) is smaller than the predetermined threshold value (in other words, if ⅓ is smaller than the predetermined value), the pass integrating section 162 determines that the pixel in which a dot is to be formed (i.e., P11) is the pixel that is used as the target of the change. Accordingly, the pixel that has been determined to be the target of the change (i.e., P11) is changed to a pixel in which no dot is to be formed. A substituting pixel (i.e., P10, in the example above, that can be integrated into the single-pass pixel set including P2 and P6) is changed to a pixel in which a dot is formed.

Figure 9:
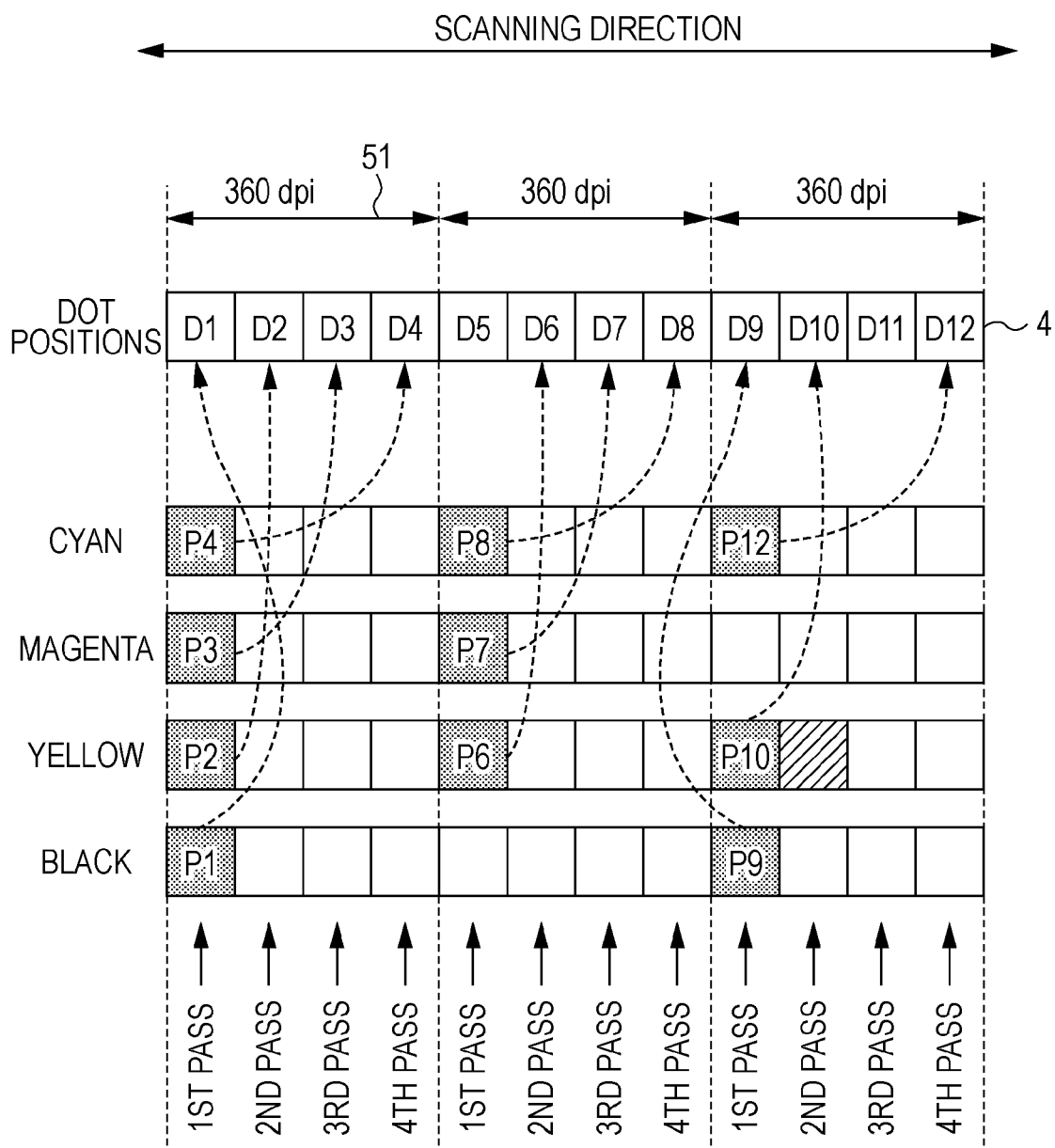
FIG. 9 is a schematic diagram illustrating an exemplary result of the pass integrating process performed in the example shown in FIG. 8, according to an embodiment of the invention.

FIG. 9 shows a result of the pass integrating process in an example in which the pixel in which a dot is to be formed has been changed from P11 to P10 by applying the speed increasing process with a dot position change. More specifically, after the modification example has been applied, there is no longer any single-pass pixel set that is to be printed in the second pass. Accordingly, the output of the image based on the raster data 3 is completed in the first pass. Consequently, there is no need to perform the second, the third, and the fourth passes, and it is therefore possible to reduce the divided pass number from 4 to 1. It should be noted, however, that there is a possibility that the quality of the image may be degraded because the pixel in which the dot is to be formed is changed. For this reason, it may be desirable to make an arrangement so that the speed increasing process with a dot position change is performed in a printing mode in which the printing speed is more important than the quality of the image, and so that the speed increasing process with a dot position change is not performed in a printing mode in which the quality of the image is more important than the printing speed.

Figure 10:
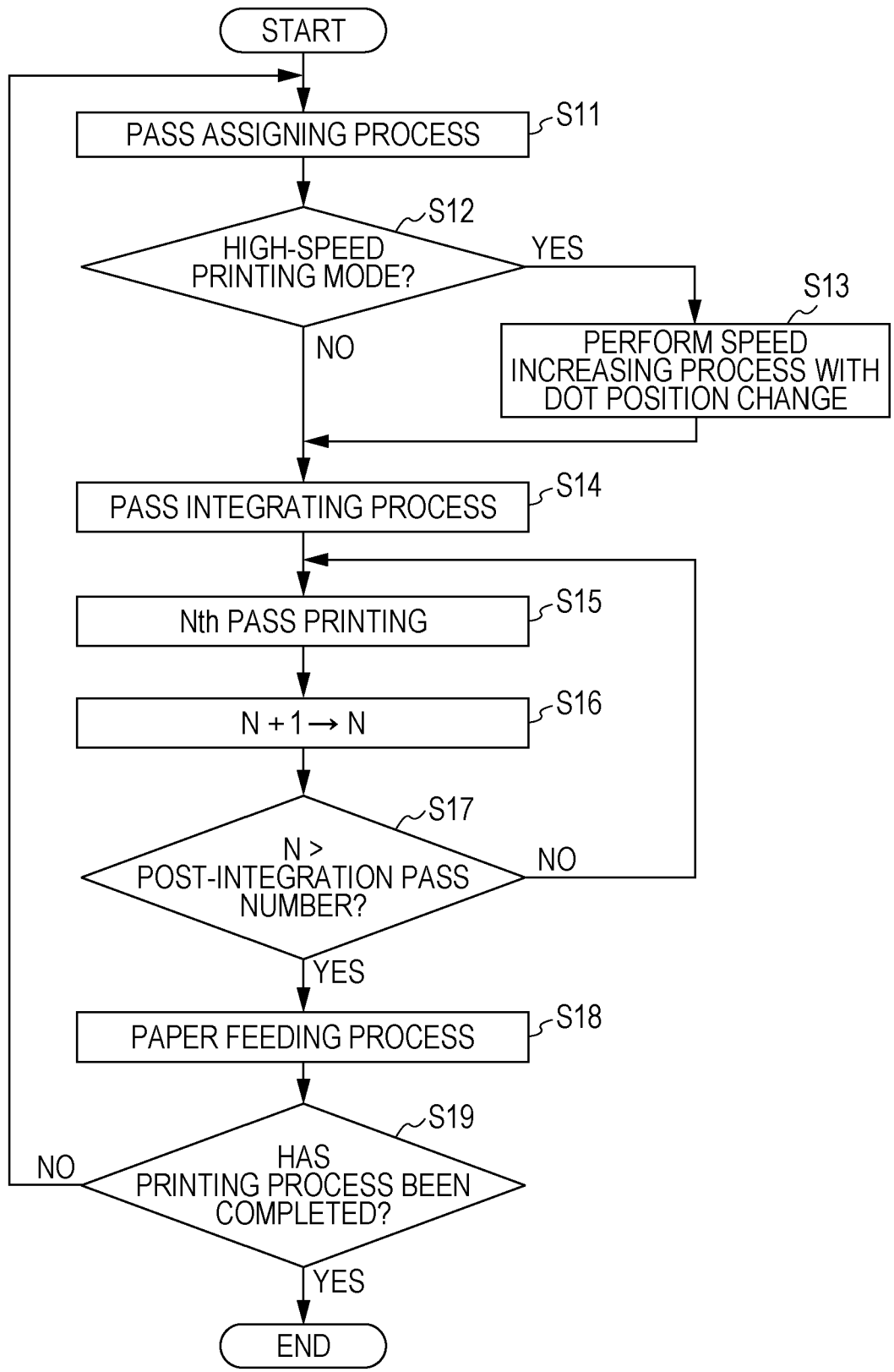
FIG. 10 is a flowchart of an overall printing process performed by a printing section, according to an embodiment of the invention.

FIG. 10 is a flowchart of an overall printing process performed by the printing section 16 according to the embodiment. N denotes a variable used for counting values from 1 to a post-integration pass number. The initial value of the variable N is assumed to be "1".

First, the pass assigning section 161 performs the pass assigning process (S11). The pass assigning process is performed in the manner explained with reference to FIG. 2.

Next, the printing section 16 judges whether or not a high-speed printing mode is being selected (S12).

In the case where the high-speed printing mode is being selected (S12: Yes), the pass integrating section 162 performs the speed increasing process with a dot position change (S13). The speed increasing process with a dot position change is performed in the manner explained with reference to FIGS. 8 and 9. After that, the pass integrating section 162 performs the pass integrating process (S14). The pass integrating process is performed in the manner explained with reference to FIGS. 3 to 6.

In contrast, in the case where the high-speed printing mode is not being selected (S12: No), the pass integrating section 162 performs the pass integrating process (S14).

After that, the printing section 16 performs the multiple-pass printing process according to the result of the pass integrating process. In other words, the printing section 16 performs the printing process in the Nth pass (S15). The printing method (i.e., the timing at which the ink is discharged) that is employed when multiple colors are used is explained above with reference to FIG. 7.

After that, the printing section 16 increments the value of N by 1 (S16).

Subsequently, the printing section 16 determines whether or not the value of N is larger than the post-integration pass number (S17).

The printing section 16 repeatedly performs the printing process at S15 as many times as the post-integration pass number (S17). More specifically, in the example shown in FIG. 6, the post-integration pass number is 2. In the example shown in FIG. 9 to which the speed increasing process with a dot position change is applied, the post-integration pass number is 1. In other words, in the example shown in FIG. 6, the printing process at S15 is performed twice, whereas in the example shown in FIG. 9 to which the speed increasing process with a dot position change is applied, the printing process at S15 is performed only once.

After that, a paper feeding process is performed (S18).

The printing section 16 repeatedly performs the processes at S11 to S18 for each of all the lines that are the targets of the printing process (S19).

The embodiments of the invention described above are presented as examples for explaining the invention. It is therefore not our intention to limit the scope of the invention to those exemplary embodiments. It is possible to embody the invention in other various modes, without departing from the spirit thereof.

The invention claimed is:

1. A liquid discharging apparatus, comprising:
a discharging section having a discharging head including a plurality of nozzles configured to discharge liquid on a medium at a pass resolution,
the discharging section being configured to:
determine a maximum divided pass number N required to repeatedly move the discharging head to discharge on a section of the medium at a desired resolution, the desired resolution being greater than the pass resolution;
determine which passes of the maximum divided pass number N will be designated to discharge the liquid from each nozzle of the plurality of nozzles; and
determine whether or not an idle pass will occur for discharging according to the maximum divided pass number N,
wherein when an idle pass is required for each nozzle of the plurality of nozzles, the discharging section is configured to modify the maximum divided pass number N to divided pass number M, M being less than N.

2. The liquid discharging apparatus of claim 1, wherein the discharging section is configured to modify the maximum divided pass number N to divided pass number M by deleting the idle pass.

3. The liquid discharging apparatus of claim 2, wherein the discharging section is further configured to move at least one of the discharging passes of the maximum divided pass number N to the deleted idle pass.

4. The liquid discharging apparatus of claim 1, wherein the plurality of nozzles includes a first group of nozzles and a second group of nozzles, and wherein the discharging section is further configured to:
when an idle pass is not required for each nozzle of the plurality of nozzles, have the second group of nozzles discharge the liquid on a second position, during a pass in which the first group of nozzles discharges the liquid on a first position.

5. The liquid discharging apparatus of claim 4, wherein the discharging section is further configured to:
when an idle pass is required for each nozzle of the plurality of nozzles, have the second group of nozzles discharge the liquid on a third position that is different from the second position, during the pass in which the first group of nozzles discharges the liquid on the first position.

6. The liquid discharging apparatus of claim 1, wherein the discharging section is further configured to:
modify discharge positions of the plurality of nozzles designated for the maximum divided pass number N for the divided pass number M.

7. The liquid discharging apparatus of claim 6, wherein the discharging section is further configured to:
determine, with respect to a selected pass that has been selected out of the plurality of passes in a selected nozzle of the plurality of nozzles, a number of maximum cycles indicating how many cycles the selected nozzle is able to discharge the liquid in the selected pass and a number of actual cycles required to discharge the liquid at the desired resolution.

8. The liquid discharging apparatus of claim 7, wherein the discharging section is further configured to:
determine whether or not a ratio of the actual cycles to the maximum cycles is equal to or lower than a predetermined threshold value.

9. The liquid discharging apparatus of claim 8, wherein the discharging section is further configured to:
determine that the ratio is equal to or lower than the predetermined threshold value, and modify the discharge position of the selected nozzle for discharging the liquid in the selected pass.

10. The liquid discharging apparatus of claim 1, wherein N is an integer that is equal to or larger than 2, and M is an integer that is equal to or larger than 1.

11. The liquid discharging apparatus of claim 1, further comprising:

a discharge controlling section connected to the discharging section via a bus, the discharge controlling section being configured to receive job data and generate raster data therefrom, the raster data used to discharge on the section of the medium at the desired resolution.

12. A method for discharging liquid, comprising:
receiving raster data having a desired resolution at a discharging section, the discharging section having a discharging head including a plurality of nozzles configured to discharge liquid on a medium at a pass resolution,
determining, using the discharging section, a maximum divided pass number N required to repeatedly move the discharging head to discharge on a section of the medium at the desired resolution, the desired resolution being greater than the pass resolution;
determining, using the discharging section, which passes of the maximum divided pass number N will be designated to discharge the liquid from each nozzle of the plurality of nozzles;
determining, using the discharging section, that an idle pass will occur for discharging according to the maximum divided pass number N; and
modifying, using the discharging section, the maximum divided pass number N into a divided pass number M, M being less than N; and
discharging the image according to the divided pass number M.

13. The method of claim 12, wherein modifying the maximum divided pass number N to divided pass number M comprises deleting the idle pass.

14. The method of claim 13, further comprising:
moving at least one of the discharging passes of the maximum divided pass number N to the deleted idle pass.

15. The method of claim 12, wherein the plurality of nozzles includes a first group of nozzles and a second group of nozzles, and wherein the discharging section is configured to:
when an idle pass is not required for each nozzle of the plurality of nozzles, have the second group of nozzles discharge the liquid on a second position, during a pass in which the first group of nozzles discharges the liquid on a first position.

16. The method of claim 15, further comprising:
discharging liquid from the second group of nozzles on a third position that is different from the second position, during the pass in which the first group of nozzles discharges the liquid on the first position.

17. The method of claim 12, further comprising:
modifying discharge positions of the plurality of nozzles corresponding to the maximum pass number N to correspond for the divided pass number M.

18. The method of claim 17, further comprising:
determining, with respect to a selected pass that has been selected out of the plurality of passes in a selected nozzle of the plurality of nozzles, a number of maximum cycles indicating how many cycles the selected nozzle is able to discharge the liquid in the selected pass and a number of actual cycles required to discharge the liquid at the desired resolution.

19. The method of claim 18, wherein the discharging section is configured to:
determine whether or not a ratio of the actual cycles to the maximum cycles is equal to or lower than a predetermined threshold value.

20. The method of claim 19, further comprising:
determining that the ratio is equal to or lower than the predetermined threshold value, and modify the discharge position of the selected nozzle for discharging the liquid in the selected pass.

* * * * *